(12) United States Patent
Thornton (10) Patent No.: US 12,433,272 B2
(45) Date of Patent: Oct. 7, 2025

(54) METHOD FOR MAKING A JIG HEAD HAVING TINSEL INCORPORATED THEREIN

(71) Applicant: Flashin Assassin Fishing Lures, L.L.C., Denham Springs, LA (US)

(72) Inventor: John Collier Thornton, Baton Rogue, LA (US)

( * ) Notice: Subject to any disclaimer, the term of this patent is extended or adjusted under 35 U.S.C. 154(b) by 193 days.

(21) Appl. No.: 18/233,679

(22) Filed: Aug. 14, 2023

(65) Prior Publication Data
US 2024/0049694 A1    Feb. 15, 2024

Related U.S. Application Data

(60) Provisional application No. 63/397,790, filed on Aug. 12, 2022.

(51) Int. Cl.
*A01K 85/01*    (2006.01)
*A01K 85/00*    (2006.01)

(52) U.S. Cl.
CPC ........ *A01K 85/013* (2022.02); *A01K 85/1833* (2022.02); *A01K 85/1897* (2022.02)

(58) Field of Classification Search
CPC ............... A01K 85/011; A01K 85/013; A01K 85/1833; A01K 85/1897; A01K 85/08; A01K 85/00
See application file for complete search history.

(56) References Cited

U.S. PATENT DOCUMENTS

| | | | | |
|---|---|---|---|---|
| 1,737,683 A * | 12/1929 | Readman | ............... | A01K 85/12 43/42.46 |
| 3,191,336 A * | 6/1965 | Cordell, Jr. | ............ | A01K 85/00 D22/128 |
| 4,163,337 A * | 8/1979 | Kress | ..................... | A01K 85/00 43/42.36 |
| 4,945,669 A * | 8/1990 | Webel | .................... | A01K 85/00 43/42.39 |
| 5,113,607 A * | 5/1992 | Pate | ...................... | A01K 85/00 D22/128 |
| 5,117,573 A * | 6/1992 | Semler | .................. | A01K 85/00 43/42.39 |

(Continued)

FOREIGN PATENT DOCUMENTS

KR    20110036212 A  *  4/2011   ......... A01K 85/1897

OTHER PUBLICATIONS

Translation of KR 20110036212 (Year: 2011).*

*Primary Examiner* — William L Gmoser
(74) *Attorney, Agent, or Firm* — Steven Scott Lloyd (57) ABSTRACT

A jig head having tinsel incorporated therein and a method for producing the same are provided. The jig head comprises a jig body, hook, and tinsel. A portion of the hook is secured within the jig body to prevent removal of the hook. A portion of the tinsel is also contained within said jig body and projected out of said jig body at the hook end. The tinsel is angled out of the jig to clear a soft bait secured to the hook, allowing the tinsel to move in a desired fashion as the jig head moves through water. Body material is kept within a specific temperature range to ensure that the tinsel does not melt as the jig body is molded. A paint layer and adhesive layer are further applied to increase durability of the tinsel at the point in which it is secured to the jig body.

10 Claims, 5 Drawing Sheets

(56) References Cited

U.S. PATENT DOCUMENTS

| | | | | |
|---|---|---|---|---|
| 5,251,395 A * | 10/1993 | Wicklund | ............... | A01K 85/00 43/42.25 |
| 5,987,805 A * | 11/1999 | Laney | .................... | A01K 85/00 43/43.13 |
| 6,266,914 B1 * | 7/2001 | Johnson | ................. | A01K 85/00 43/42.13 |
| 6,272,787 B1 * | 8/2001 | Link | ...................... | A01K 85/00 427/256 |
| 6,393,758 B1 * | 5/2002 | Sparkman | ............. | A01K 85/08 43/42.25 |
| 6,748,693 B1 * | 6/2004 | Snyder | ................... | A01K 85/01 426/1 |
| 7,234,267 B1 * | 6/2007 | Konstant | ................ | A01K 85/02 43/42.24 |
| D651,276 S * | 12/2011 | Osgood | ........................ | D22/128 |
| 10,993,422 B1 * | 5/2021 | Maji | .................. | A01K 85/1821 |
| 11,206,819 B1 * | 12/2021 | Rye | ........................ | A01K 95/00 |
| 12,053,916 B1 * | 8/2024 | Jones | ................. | B29C 33/3842 |
| 2002/0092640 A1 * | 7/2002 | Ratte | ................... | B22D 21/027 164/113 |
| 2004/0055205 A1 * | 3/2004 | Pack | ...................... | A01K 85/00 43/42.53 |
| 2006/0201050 A1 * | 9/2006 | Troutman | .............. | A01K 85/10 43/42.39 |

* cited by examiner

METHOD FOR MAKING A JIG HEAD HAVING TINSEL INCORPORATED THEREIN

CROSS-REFERENCE TO RELATED APPLICATIONS

This application claims the benefit of priority of U.S. Provisional Patent App. Ser. No. 63/397,790, the contents of which are hereby incorporated by reference in their entirety.

FIELD OF THE INVENTION

The subject matter of the present disclosure refers generally to a jig head having tinsel incorporated therein and a method for creating the same.

BACKGROUND OF THE INVENTION

Jig heads are a highly effective type of lure used for catching fish. They are also very effective in a wide range of environments with proper setup (and when presented correctly). This setup not only includes an appropriate rod for the detection of soft bites but also the proper dress of the jig head to encourage said bites. Like flies created for fly fishing, jigs can be customized in many different ways by fisherman to mimic local food sources in which local fish might be interested, depending on the season. Many jigs are dressed by adding hair, feathers, soft plastic, silicone or rubber skirts to the molded hook shank, which adds bulk and profile. This dress also helps mimic the movement of these local food sources through the water, including a reduction the sink rate that better mimics local food sources such as crawfish, leeches, minnows and amphibians.

Jigs are made using a mold, which shapes material (usually molten metal) to form the jig's body, including the head and collar. Most jig heads are made from lead, which gives the lure its weight. Tungsten is also becoming a popular substance for weighting jigs as it is heavier than lead and more environmentally friendly. However, due to the high melting temperatures of the metals most often used to create jig heads, the incorporation of dress into the jig body itself has proven difficult. Tinsel and mylar are exceptional fly-tying materials, as their reflective surface provide similar undulating movements to baitfish. Additionally, tinsel or mylar can be tied with a variety of techniques—spun in dubbing loops, reverse-tied, center-tied and standard—to create various forms of aquatic prey. Unfortunately, these materials are made of polymers that have melting points below or very near the melting point of lead. As such, these and other dress materials have had to be secured to the jig body after production of the jig head, increasing the time it takes to make a dressed jig head. However, one of ordinary skill in the art will understand that there are a multitude of other synthetic materials that can be used as fish attractants and embedded inside the jig head, thereby maintaining better mobility and durability while in use as compared to materials that have to be attached to the jig body after production, which may be detached more easily.

Accordingly, there is a need in the art for a process to make a jig head having a synthetic material incorporated therein in a way that doesn't result in the material melting during the molding process.

BRIEF SUMMARY OF THE INVENTION

A jig head having a fish attractant material incorporated therein and a method for producing said jig head are provided. In one aspect, the present disclosure provides a jig head having material incorporated directly into the body of the jig head, which acts separately and in addition to any jig body in order to attract marine life. In another aspect, the present disclosure provides a method for creating a jig head having tinsel or an equivalent material incorporated therein using lead or lead alloy for the jig body. In yet another aspect, the present disclosure provides a method for creating a jig head having tinsel incorporated therein using metal powder/epoxy composite for the jig body. In yet another aspect, mylar can be bonded to the sides of a metal jig head or fully embedded inside the metal, either in strips or a contiguous piece. At least one bump can be used to adjust the angle of the mylar so it doesn't bunch, wherein the angle at which the mylar exits the jig when a plastic body or live bait, for example, is added to a hook secured within the jig body, is such that it is ideal for attracting fish. Ideally, the angle at which the mylar exits should be such that it doesn't interfere with a trailer tube that can be threaded onto a hook or bait keeper, as will be understood by one of ordinary skill in the art. Generally, the system and method of the present disclosure provide a new type of jig head for use when fishing.

The jig head generally comprises a jig body, hook, and tinsel. A portion of the hook is secured within the jig body in a way that prevents removal of the hook from the jig body. A portion of the tinsel is contained within said jig body and projected out of said jig body at the hook end. The tinsel is angled out of the jig such that the tinsel will clear a soft bait secured to the hook, allowing the tinsel to move in a desired fashion as the jig head moves through water. The jig body may comprise at least one bump to create a shape that allows the tinsel to clear a soft bait at the desired angles. The jig body is preferably made from lead, lead alloy, or metal powder/epoxy composite. Depending on the material used to construct the jig body, the method of production may change, as the material used to create the jig body may prevent the use of the jig head in certain jurisdictions.

A mold is used to create a jig head having tinsel incorporated therein and comprises a male half and female half, wherein said male half and female half each comprise one half of a body cavity, hook cavity, flashing channel, and pouring gate. The body cavity of each half is shaped in a way that forms the desired shape of the jig head. Preferably, each body cavity of the mold has two associated flashing channels, which are configured to hold the tinsel therein while the body material is poured though the pouring gate and into the body cavity. The flashing channels extend from the hook end of the body cavity at the location/angle required to prevent bunching of the tinsel when a soft bait is secured to the hook of the jig head. When pouring/injecting the lead or lead alloy into the mold, one must be careful to not increase the temperature of the lead or lead alloy so much to cause the viscosity of the lead or lead alloy to become so great that the lead or lead alloy freely flows into the flashing channels holding the tinsel. A too high a temperature could also melt or singe the tinsel. Though the working temperature of metal powder/epoxy composites is naturally lower than that of liquid metal, care still must be taken to manage the viscosity of the unset metal powder/epoxy composites before they are poured within the mold.

A method for creating a jig head having tinsel incorporated therein using lead or lead alloy consists of several steps that take into consideration the fragility of the tinsel at higher temperatures. The lead or lead alloy must be melted at a temperature that is below the melting point of the tinsel or the tinsel will be destroyed. The further below the melting point of the tinsel that the lead or lead alloy can be kept, the less likely that the tinsel will be chemically altered and thus change its behavior when moving through water. It is also important to reduce direct exposure of the tinsel to any direct heat sources, which may emit heat at temperatures higher than what is intended. This may be accomplished by placing a molded jig head in an enclosed baking container prior to undergoing any baking processes. Additionally, application of an adhering agent after application of paint but prior to baking has been found to increase the durability of the tinsel at the point in which it attaches to the jig head.

The foregoing summary has outlined some features of the system and method of the present disclosure so that those skilled in the pertinent art may better understand the detailed description that follows. Additional features that form the subject of the claims will be described hereinafter. Those skilled in the pertinent art should appreciate that they can readily utilize these features for designing or modifying other methods for carrying out the same purpose of the methods disclosed herein. Those skilled in the pertinent art should also realize that such equivalent modifications do not depart from the scope of the methods of the present disclosure.

BRIEF DESCRIPTION OF THE DRAWINGS

These and other features, aspects, and advantages of the present disclosure will become better understood with regard to the following description, appended claims, and accompanying drawings where:

DETAILED DESCRIPTION OF THE INVENTION

In the summary of the invention above and in this detailed description, and the claims below, and in the accompanying drawings, reference is made to particular features, including process steps, of the invention. It is to be understood that the disclosure of the invention in this specification includes all possible combinations of such particular features. For example, where a particular feature is disclosed in the context of a particular aspect or embodiment of the invention, or a particular claim, that feature can also be used, to the extent possible, in combination with or in the context of other particular aspects of the embodiments of the invention, and in the invention generally. Where reference is made herein to a process comprising two or more defined steps, the defined steps can be carried out in any order or simultaneously (except where the context excludes that possibility), and the process can include one or more other steps which are carried out before any of the defined steps, between two of the defined steps, or after all the defined steps (except where the context excludes that possibility).

The term "eutectic alloy" and grammatical equivalents thereof are used herein to mean a homogeneous mixture of metals that melts or solidifies at a single temperature and possesses a melting point lower than that of any of the constituents. For instance, antimony, lead, and tin create a linotype alloy having eutectic properties when mixed at appropriate ratios. The term "tinsel" and grammatical equivalents thereof are used herein to mean decorative polymers used to attract the attention of marine life. For instance, holographic tinsel comprised of polyvinyl chloride may be used to create lures that attract the attention of marine life as it moves and reflects in the water.

Figure 1:
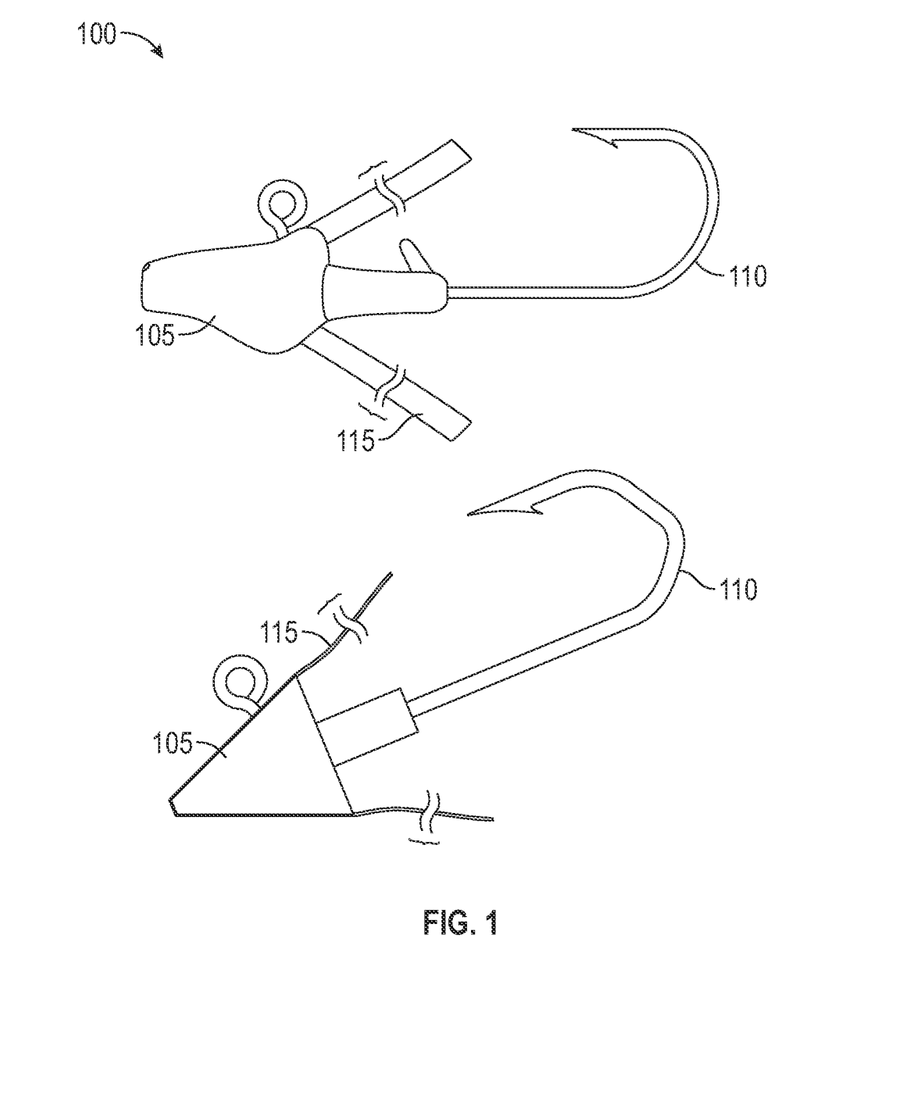
FIG. 1 is an illustration of a jig head that may be produced using a method embodying features consistent with the principles of the present disclosure.
Figure 2:
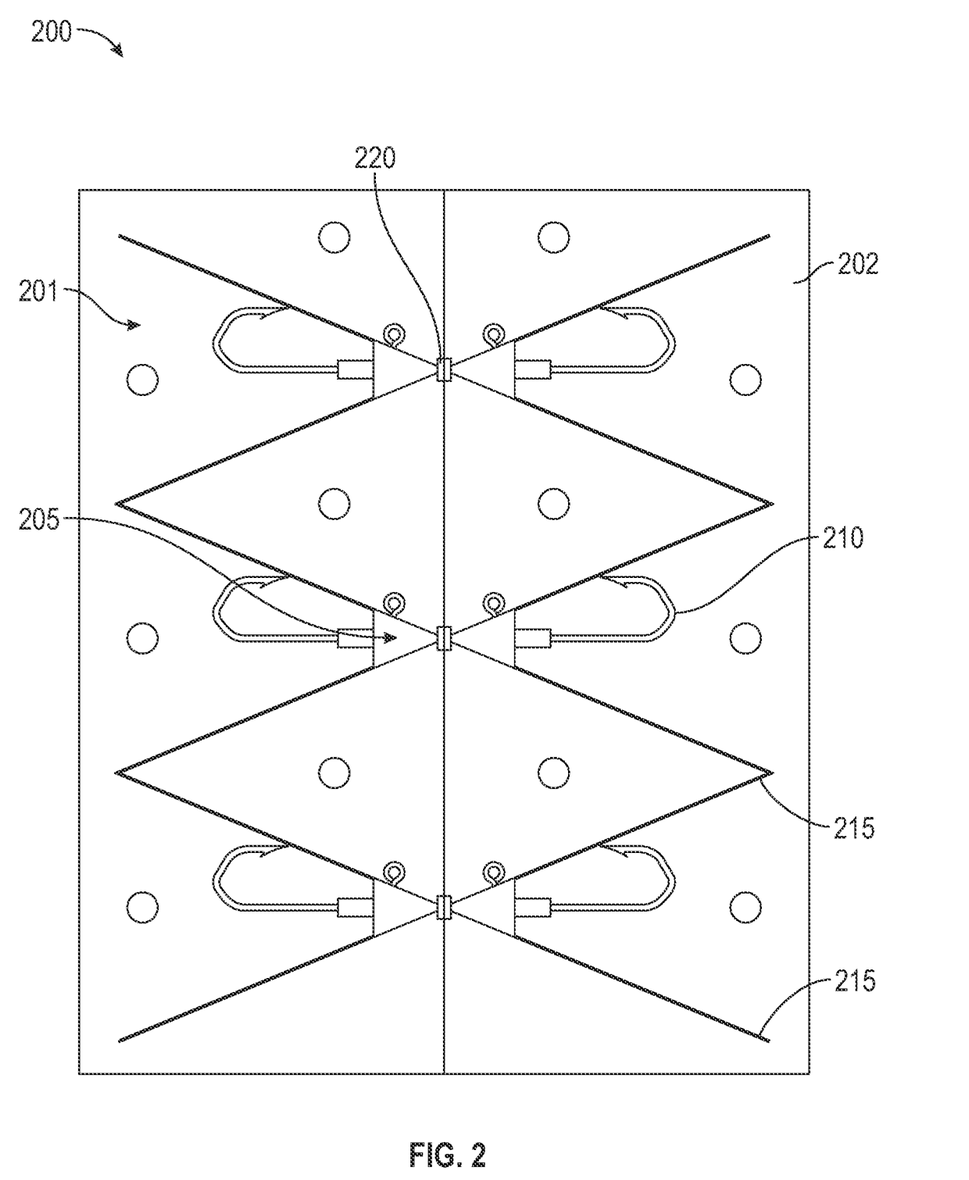
FIG. 2 is an illustration of a mold that may be used to produce a jig head using a method embodying features consistent with the principles of the present disclosure.
Figure 3:
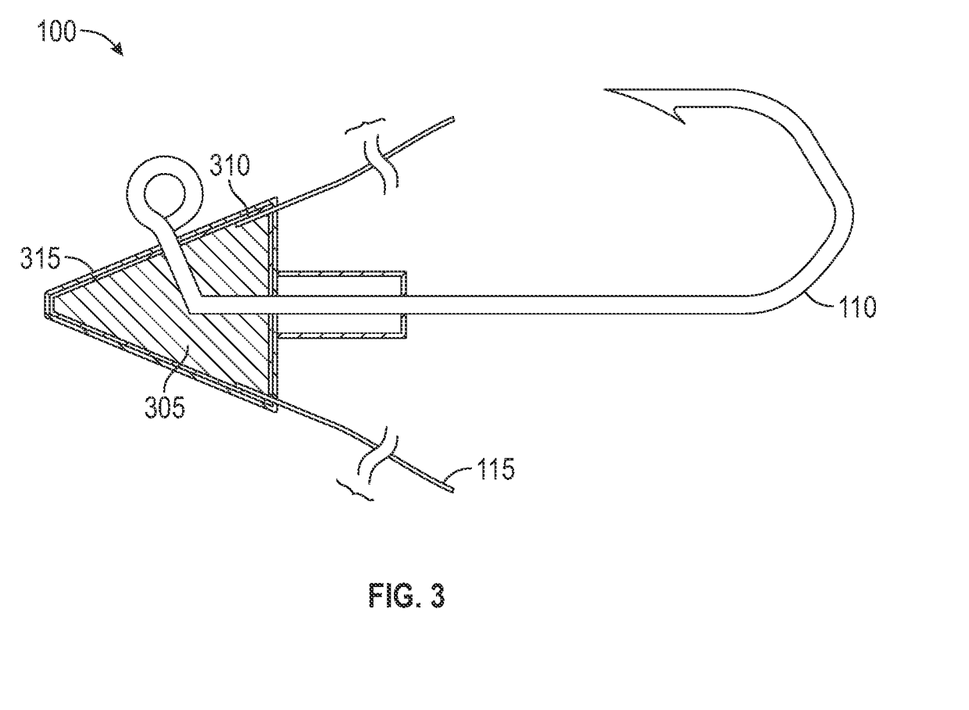
FIG. 3 is a cross sectional view of a jig head that may be produced using a method embodying features consistent with the principles of the present disclosure.
Figure 4:
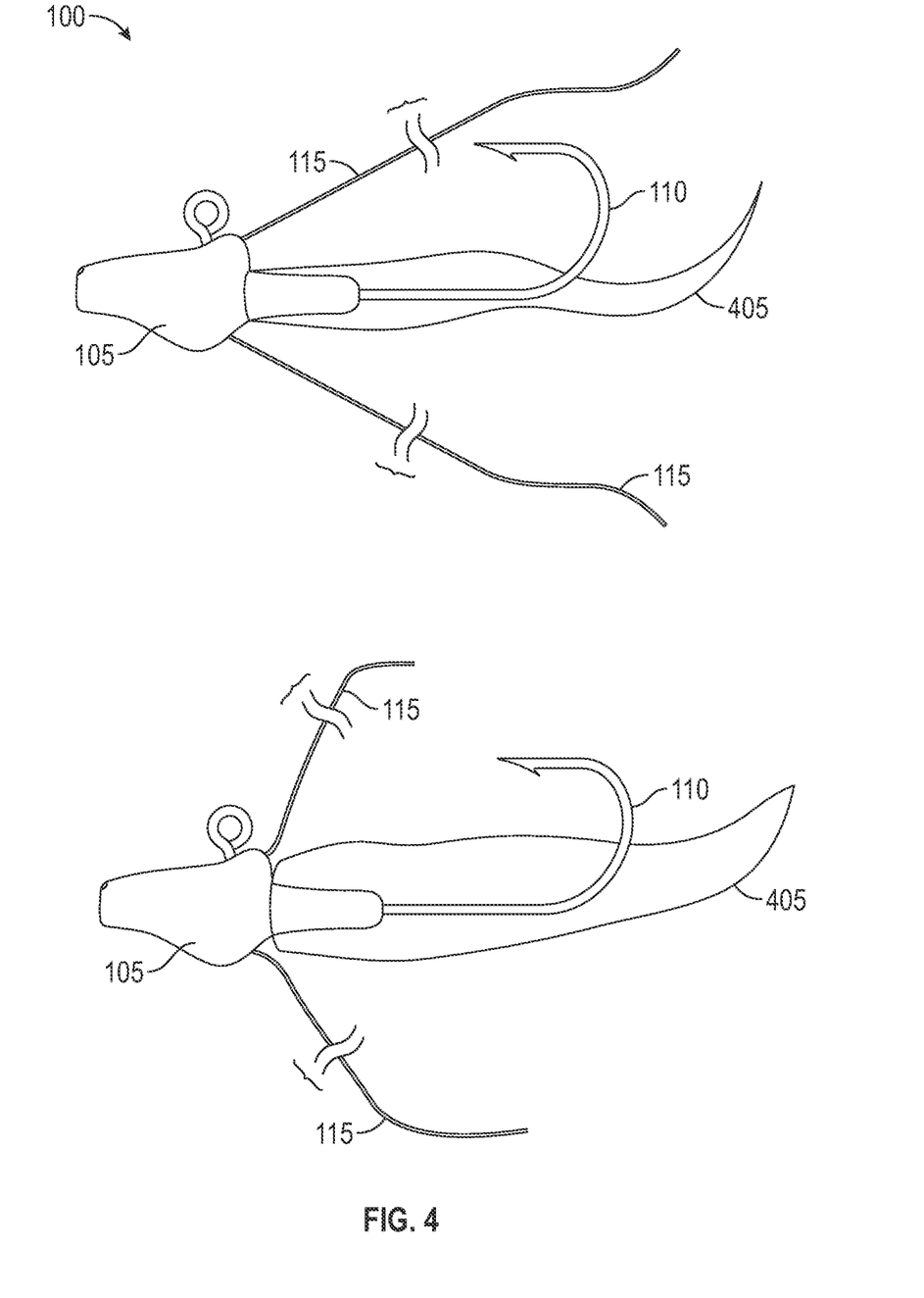
FIG. 4 is an environmental view of a jig head having properly positioned tinsel incorporated into the lead and a jig head having tinsel that is not properly incorporated into the jig head.
Figure 5:
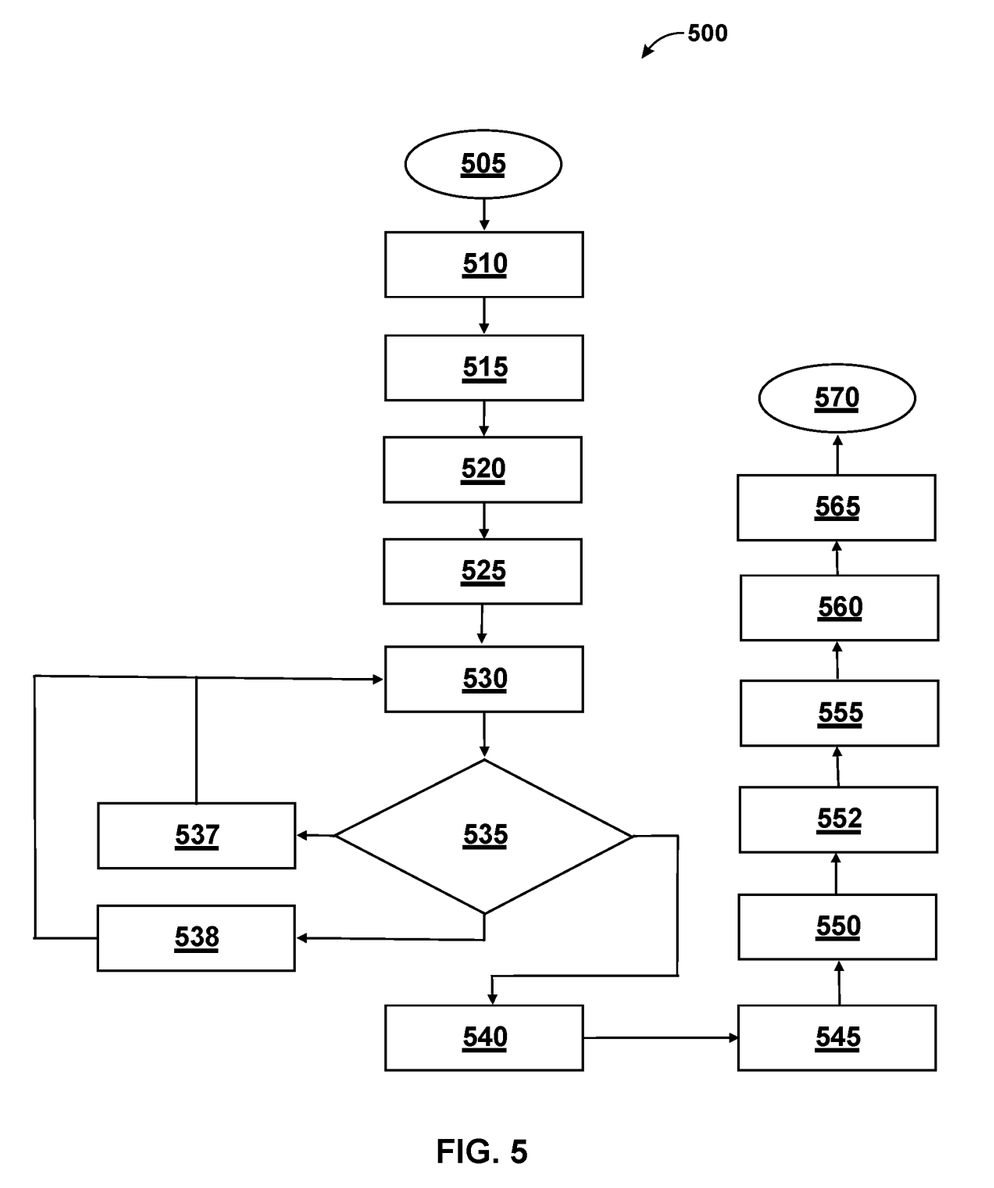
FIG. 5 is a flow chart illustrating certain method steps of a method embodying features consistent with the principles of the present disclosure.

FIGS. 1-5 illustrate embodiments of a jig head 100 having tinsel 115 incorporated therein and a method for producing the jig head 100 having tinsel 115. FIG. 1 is an exemplary diagram of a jig head 100 having tinsel 115 incorporated therein. FIG. 2 is an exemplary diagram of a mold 200 used to create a jig head 100 having tinsel 115 incorporated therein. FIG. 3 is a cross sectional view if a jig head 100 having tinsel 115 incorporated therein. FIG. 4 illustrates a jig head 100 having tinsel 115 correctly incorporated and a jig head 100 not having tinsel 115 correctly incorporated. FIG. 5 illustrates a method for making jig heads 100 illustrated in FIG. 1. It is understood that the various method steps associated with the method of the present disclosure may be carried out by a user using the mold 200 shown in FIG. 2.

As illustrated in FIG. 1, the jig head 100 generally comprises a jig body 105, hook 110, and tinsel 115. The jig body 105 comprises a line end and a hook 110 end, wherein the hook 110 projects out of said hook 110 end and the line end is opposite said hook 110 end. A portion of said hook 110 is secured within the jig body 105 in a way that prevents removal of the hook 110 from the jig body 105. The hook 110 is sized to allow for the installation of a soft bait 405 thereto. A portion of the tinsel 115 is contained within the jig body 105 and projected out of said jig body 105 at said hook 110 end. The jig body 105 is angled such that the tinsel 115 will clear said soft bait 405 when said soft bait 405 is secured to the hook 110. If the tinsel 115 is not correctly angled to allow for clearance of the soft bait 405, the tinsel 115 will bunch, as illustrated in FIG. 4, causing a change in behavior of the tinsel 115 as said jig head 100 moves through the water. In a preferred embodiment, the tinsel 115 makes no less than a 30° angle with the hook 110, depending on the attachment location of the tinsel 115 on the jig body 105. However, smaller angles may be used, depending on the size and shape of the jig body 105. As such, the jig body 105 must be shaped and sized in way such that any tinsel 115 can clear any soft bait 405 attached to the hook 110 so that the tinsel may flow freely as it moves through the water. In some preferred embodiments, as illustrated in FIG. 1, the jig body 105 has at least one bump such that the shape of the jig body 105 allows the tinsel 115 to clear the soft bait 405 at a desirable angle.

FIG. 2 illustrates a mold 200 used to create the jig head 100 having tinsel 115 incorporated therein. The body material 305 used to make the jig body 105 is preferably lead or a lead alloy comprising at least 84% lead. In a preferred embodiment, linotype lead alloy comprising approximately 84% lead, 11.5% antimony, and 4.25% tin is used to create the jig body 105. This linotype lead alloy is a eutectic alloy with a melting point of approximately 476° F. and an operating range between 515° F. and 550° F. The lead or lead alloy is preferably melted within a melting housing of a melting pot, which may or may not comprise a bottom pour spout that allows for melted lead to flow directly from the bottom of the melting housing to a mold 200. In a preferred embodiment, the temperature of the lead in the melting pot is kept between 625° F. and 700° F. Preferably, ventilation about the melting pot vents away lead oxide fumes created during the melting process. In some preferred embodiments, a user may wear a ventilator to further reduce exposure to lead oxide fumes.

The melted lead or lead alloy is poured into the cavities of the mold 200 and allowed to cool so that the lead takes on the desired shape of the jig head 100. The tinsel 115 used to construct the jig head 100 is at least partially contained within the jig cavity prior to the pouring of lead or lead alloy into the mold 200 so that a portion of the tinsel 115 is secured within the body of the freshly poured jig body 105. In a preferred embodiment, the tinsel 115 is holographic tinsel 115 having a melting point of at least 500° F.; however, tinsel 115 having lower melting points may be used without departing from the inventive subject matter described herein. The higher the melting point of the tinsel 115 the less singeing/coiling of the tinsel 115 occurs once the melted lead or lead alloy is poured into the jig cavity. If the melting point of the tinsel 115 is too low or the lead is too hot, the tinsel 115 could be damaged to the point of becoming detached from the jig body 105. As such, much care must be given to the melting point of the tinsel 115 as well as the temperature of the melted lead. In another embodiment, mylar can be inserted into grooves in the mold, where the mylar is laying on its side when the lead or lead alloy is added or inserted into the mold with the flat side of the mylar facing upward. One of ordinary skill in the art will understand that the position of the selected flash material and how it is laid into the mold is directly related to how the eye of the hook is positioned on the jug and bait is retrieved. When jigged upward or downward, the mylar is laid on its side into the grooves, with the flat side of the flash material facing downward. For casting and retrieval, the flash material should be inserted with the flat side facing upward when inserted into the mold so the flash material faces bottom when it is cast and retrieved.

The lead or lead alloy is melted inside a heating apparatus and can be either poured into a mold or spun (where the lead or lead alloy is projected into cavities within a spinning cylinder). The temperature of the lead or lead alloy depends on several factors. When poured into a mold, the size of the hole in which it is poured relative to the size of the jig head is important. A lower temperature is usually required because the lead is being poured downward. When the lead or lead allow is spun, it typically is at a higher temperature because the lead is flowing outward. Also, when a metal bait keeper is added to the mold, the temperature of the lead or lead alloy must be adjusted based on the size of the neck being poured and the circumference of the hook. The smaller the bait keeper and larger the circumference of the hook, the greater the need to increase the temperature of the metal, and vice-versa.

Alternatively, a metal powder/epoxy composite may be used to create the jig body 105. Types of metal powders that may be used to create a metal powder/epoxy composite for use in the creation of jig heads 100 include, but are not limited to, lead powder, bronze powder, iron powder, and tungsten powder. In a preferred embodiment, tungsten powder is used to create metal powder/epoxy composites. Metal powder/epoxy composites are prepared by blending epoxy resin with different weight percentages of metal powder, depending on the desired density of the jig body 105. A heavy-duty mixer may be used to mix the epoxy and the metal powder so that the epoxy and metal powder are homogeneously mixed. It is important that the mixer not mix air into the epoxy or it may cause the jig body 105 to develop deformities as the epoxy sets.

Additionally, it is preferred that an equal amount of metal powder is mixed with the epoxy resin and the epoxy hardener prior to combining the epoxy resin with the epoxy hardener as to reduce the viscosity differences between the epoxy resin and epoxy hardener so that they more evenly mix. In a preferred embodiment, a slow set epoxy is used to create a metal powder/epoxy composite, but other types of epoxies may be used without departing from the inventive subject matter described herein. In embodiments where a slow set epoxy is used to create the jig head 100, the metal powder/epoxy composite is preferably placed within a vacuum chamber prior to pouring in order to assist with the degassing of the epoxy prior to injection within the mold 200. Further, metal powder/epoxy composite jig heads 100 may be placed in a pressure-pot as the body material 305 cure within the mold 200 in order to reduce defects in the final product. Because metal powder/epoxy composites can be molded at much lower temperatures than lead, the melting point of the tinsel 115 used is less important than when the body material 305 is made of metal that has been melted. Further, in jurisdictions with laws that restrict the use of lead based lures, the metal powder/epoxy composites might be the only option.

The mold 200 comprises a male half 201 and female half 202, wherein said male half 201 and female half 202 each comprise a body cavity 205, hook cavity 210, flashing channel 215, and pouring gate 220. In a preferred embodiment, the mold 200 is made of a material that won't lose its shape at temperatures greater than 700° F. Materials that may be used to construct the mold 200 include, but are not limited to, aluminum, polyester putty, water putty, plaster, silicon, or any combination thereof. The body cavity 205 of each half is shaped in a way that forms the desired shape of the jig head 100, and the cavities of the male half 201 and female half 202 may mirror one another or may be shaped differently, depending on the desired shape of the jig head 100. In a preferred embodiment, at least two flashing channels 215 extend to the body cavity 205 and are configured to hold tinsel 115 therein. The flashing channels 215 extend from the hook 110 end of the body cavity 205 at the angle required to prevent bunching of the tinsel 115 when a soft bait 405 is secured to the hook 110 of the jig head 100.

When pouring/injecting the lead or lead alloy into the mold 200, one must be careful to not increase the temperature of the lead or lead alloy so much to cause the viscosity of the lead or lead alloy to become so great that the lead or lead alloy freely flows into the flashing channels 215 holding the tinsel 115. Should the lead or lead alloy flow into the flashing channels 215, the tinsel 115 will become at least partially coated in said lead or lead alloy, causing the tinsel 115 to become stiff/inflexible when the lead or lead alloy cools and hardens. Losing flexibility of the tinsel 115 would result in a change in the action of the jig head 100 as it moves through the water, resulting in a loss in the jig head's 100 ability to attract marine life. Additionally, a coating of lead or lead alloy on the tinsel 115 would dull the color of the flashing, reducing the attractiveness of the jig head 100 to marine life. Therefore, it is imperative that the temperature of the lead or lead alloy be kept in a range that prevents to flow of lead or lead alloy into the flashing channels 215. In a preferred embodiment, body material 305 is kept in a temperature range of 430° F. to 550° F. degrees during the pouring process, depending on the lead alloy and tinsel 115 used. However, higher temperature ranges could be used so long as the viscosity of the body material 305 does not become too great and the melting point of the tinsel 115 is not exceeded.

Though the lower workable temperature minimizes or eliminates singeing or melting of many types of tinsel 115, methods for creating embodiments of the jig head 100 comprising metal powder/epoxy composite as the body material 305 still must take the viscosity of the unset metal powder/epoxy composite into consideration as to prevent the seepage of the metal powder/epoxy composite into the flashing channels 215. The viscosity of the metal powder/epoxy composite may be increased by increasing the percentage of metal powder contained within the composite. A user may also control the viscosity of the metal powder/epoxy composite by timing the pouring of the unset metal powder/epoxy composite based on when the epoxy resin and epoxy hardener have been combined.

Jig heads 100 are removed from the molds 200 once the body material 305 has solidified and subsequently covered in paint to create a paint layer 310. Alternatively, epoxy powder paint may be used when the jig is dipped before being baked or sprayed on with a small nozzle. In some preferred embodiments, excess body material 305 must be removed from the jig body 105 using a cutting device, such as a wire cutter, prior to the application of the paint layer 310. In embodiments in which the body material 305 comprises a lead or lead alloy, an epoxy paint is used to coat the jig body 105, wherein the epoxy paint is preferably in powder form. If the body material 305 is still hot (i.e., above 360° F.), a user may simply dip the jig head 100 into the powdered epoxy paint, allowing it to adhere to the jig body 105. Otherwise, a heat source may have to be applied to the jig body 105 prior to the dipping of the jig body 105 in the powdered epoxy paint. In embodiments where a metal powder/epoxy composite is used to create the jig body 105, a high temperature epoxy may be necessary in order to prevent the alteration of the chemical structure of the epoxy due to the heat. Alternatively, a vinyl paint may be used to coat the jig body 105, which may eliminate the need for heating of the jig body 105 prior to the application of the paint.

The jig head 100 is preferably baked after the paint layer 310 has been applied to the jig body 105, wherein the tinsel is contained within the body material 305 and further secured via the paint layer 310. In a preferred embodiment, a jig head 100 being of a size of ⅛ ounce is baked at a temperature of 350° F. for 20 minutes in order for the paint to cure on the jig body 105. However, temperature and time in this process are dependent on the type of oven or heating unit being used. It is important at this point in the process that there are no gaps in the selected heating unit that allow direct heat to enter inside the unit, which can cause the flash material to wilt, bend, or singe, reducing the durability of the material. Ideally the selected heating unit will be fabricated from a non-flammable material that does not absorb heat and maintains a constant interior temperature. Since heat rises, the height at which the jigs are hung inside the unit affects the flash material. Smaller jigs with shorter flash can be hung upside down by the hook but ideally the jigs need to be hung with the flash material facing downward to prevent it from curling while baking. Smaller jig heads 100 may require a shorter baking time whereas larger jig heads 100 may require a longer baking time. Direct heat can pose a threat to heat sensitive materials depending on the source of the heat. For instance, oven coils can get much hotter than the desired temperature within the oven. As such, care must be taken to not damage the incorporated tinsel 115. Further, metal powder/epoxy composite based jig bodies must be carefully heated as well in order to prevent the degradation of the chemical structure of the epoxy. Indirect heat allows for the baking of heat sensitive materials without exposing said heat sensitive materials to heating elements that might be at a temperature that will cause degradation. In particular, the polymer from which the tinsel 115 is made may chip, crack, and break if exposed to very high direct temperatures for too long. Therefore, in one preferred embodiment, painted jig bodies may be placed into a protective, enclosed baking container prior to being placed into the oven, which may allow the paint coating the jig body 105 to cure while simultaneously preventing the tinsel 115 from being directly exposed to excessive heat. In a preferred embodiment, the baking container is made of wood or some other highly insulative material to reduce the chance of the container material becoming too hot and damaging any jig head 100 components in direct contact with the baking container. In one preferred embodiment, the baking container is completely enclosed as to reduce any risk of wilting the tinsel 115.

In another preferred embodiment, an adhesion promoter may be applied to the jig head 100 lure after the application of the paint but before baking to create an adhesion layer 315. The adhesion layer 315 encourages binding of the paint to the jig body 105, increasing durability of the paint layer 310 and reducing damage when struck by a fish. Additionally, the adhesion layer 315 encourages the binding of the paint to the tinsel 115, which reinforces the point at which the tinsel 115 is bound to the jig body 105. Other layers of adhesion promoter and/or paint may be applied to the jig body 105 once removed from the oven. In a preferred embodiment, an additional adhesion layer 315 is applied to the jig body 105 once removed from the oven, which provides another layer of material securing the tinsel 115 to the jig head 100 that increases the durability of the tinsel 115 at the attachment point in addition to the durability of the paint layer 310.

FIG. 5 provides a flow chart 500 illustrating certain, preferred method steps that may be used to carry out the process of making a jig head 100 having tinsel 115 incorporated therein, as illustrated in FIGS. 1-4. Step 505 indicates the beginning of the method. During step 510, a user may obtain a jig mold 200, lead or lead alloy, jig hooks 110, tinsel 115, melting pot, epoxy paint, adhesion promoter, baking container, and oven. Once obtained, the user may melt the lead or lead alloy within the melting pot during step 515. The user may place a hook 110 within the hook cavity 210 and tinsel 115 within the flashing channel 215 during step 520, wherein the tinsel 115 extends from the flashing channel 215 into the body cavity 205 such that the tinsel 115 is partially contained within the body cavity 205. The user may combine the male half 201 and female half 202 of the mold 200 during step 525. Once the mold 200 has been prepared, the user may perform a query to determine the temperature of the lead or lead alloy during step 530. Based on the results of the query, the user may take an action during step 535.

If the lead or lead alloy is too hot, the user may reduce the temperature of the melting pot during step 537 and return to step 530. If the lead or lead alloy is too cold, the user may increase the temperature of the melting pot during step 538 and return to step 530. If the temperature of the lead or lead alloy is in a desired range, the user may proceed to step 540 and pour the melted lead or lead alloy into the mold 200 via the pouring gate 220. Once the lead or lead alloy has solidified within the mold 200, the user may take apart the male/female halves of the mold 200 and remove the jig head 100 during step 545. The user may then dip the jig body 105 into the epoxy paint during step 550, wherein the temperature of the jig head 100 is above approximately 360° F. so that the epoxy paint adheres to the jig body 105 once applied. The jig body 105 is then sprayed with an adhering agent during step 552 and subsequently placed into a baking container by the user during step 555, being careful that the tinsel 115 of the jig head 100 is not in contact with the walls of baking container once placed therein. Once the jig heads 100 are secured within the baking container, the user may place the baking container within the oven during step 560 and bake the jig heads 100 until the epoxy paint and adhering agent have set thereon. The user may remove the jig heads 100 from the oven during step 565 and subsequently proceed to terminate method step 570.

Although the systems and processes of the present disclosure have been discussed for use within the fishing field, one of skill in the art will appreciate that the inventive subject matter disclosed herein may be utilized in other fields or for other applications in which tinsel is to be embedded within lead formed using molds. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flow depicted in the accompanying figures and described herein does not necessarily require the particular order shown, or sequential order, to achieve desirable results. It will be readily understood to those skilled in the art that various other changes in the details, materials, and arrangements of the parts and process stages which have been described and illustrated in order to explain the nature of this inventive subject matter can be made without departing from the principles and scope of the inventive subject matter.

What is claimed is:

1. A jig head lure comprising:
   a jig body having a line end and hook end; wherein said jig body comprises a eutectic alloy; wherein the eutectic alloy is a combination of materials selected from the group consisting of lead, antimony, and tin;
   a hook configured to secure a soft bait, wherein said hook is projected from said jig body at said hook end; and
   tinsel secured to said jig body, wherein said tinsel is secured to said jig body at said hook end, wherein said tinsel is projected from said jig body at an angle sufficient to prevent bunching of said tinsel when a soft bait is secured to said hook;
   wherein at least a portion of said tinsel is contained within said jig body.

2. The jig head lure of claim 1, wherein said jig body is at least partially covered in at least one layer of paint, and wherein said jig body is at least partially covered in at least one layer of an adhesion promoter;
   wherein said tinsel is further secured to said jig body at an attachment point via said at least one layer of paint.

3. The jig head lure of claim 2, wherein said tinsel is further secured to said jig body at said attachment point via said at least one layer of an adhesion promoter.

4. The jig head lure of claim 1, wherein the jig body comprises a body cavity having at least two flashing channels, wherein said flashing channels are configured to hold said tinsel therein.

5. The jig head lure of claim 1, wherein said tinsel is holographic tinsel having a melting point of no less than 500 degrees Fahrenheit.

6. The jig head of claim 1, further comprising at least one bump on said jig head, wherein said at least one bump allows said tinsel to project from said body at said angle, thereby preventing interference of said tinsel with a material threaded onto a hook.

7. A method for creating a jig head lure, comprising the steps of:
   melting a eutectic alloy; wherein said eutectic alloy is a lead alloy composed of materials selected from the group consisting of lead, antimony, tin, and combinations thereof;
   inserting a hook into a hook cavity of a jig mold having a male half and a female half;
   inserting tinsel into a flashing channel of said jig mold, wherein said tinsel extends from said flashing channel into a body cavity of said jig mold such that said tinsel is partially contained within said body cavity;
   pouring or spinning said eutectic alloy into said jig mold;
   allowing said eutectic alloy to solidify; and
   separating said male half from said female half of said jig mold.

8. The method of claim 7, further comprising applying an epoxy paint to said jig body and allowing said epoxy paint to adhere to said jig body.

9. The method of claim 8, further comprising:
   spraying said jig body with an adhesion promoter and placing said jig body into a baking container, wherein said tinsel does not contact a wall of said baking container once placed therein;
   placing said baking container into an oven; and
   baking said jig head until said epoxy paint and said adhesion promoter have set thereon.

10. The method of claim 7, wherein said tinsel is holographic tinsel having a melting point of at least 500 degrees Fahrenheit.

* * * * *